June 26, 1962 H. SCHURR ETAL Re. 25,192

SPINDLE DRIVING MECHANISM

Original Filed May 7, 1956 11 Sheets-Sheet 1

INVENTORS
Hans Schurr
Hans Stahlecker
BY
Wand Kind Haselton
Osmond McElhannon
ATTORNEYS.

SPINDLE DRIVING MECHANISM

Original Filed May 7, 1956 11 Sheets-Sheet 2

INVENTORS
Hans Schurr
Hans Stahlecker
BY
Brand Brad Haseltine
Olms & Mc Ellennon
Attys

SPINDLE DRIVING MECHANISM

Original Filed May 7, 1956 11 Sheets-Sheet 3

INVENTORS
Hans Schurr
Hans Stahlecker
BY
Wardwell Hamilton
Anne & Mrs Ellsworth
Attys

SPINDLE DRIVING MECHANISM

Original Filed May 7, 1956 11 Sheets-Sheet 4

INVENTORS
Hans Schurr
Hans Stahlecker
BY Howard Neal Haselton
Owen & Hasselhorn
Attys

SPINDLE DRIVING MECHANISM

Original Filed May 7, 1956 11 Sheets-Sheet 5

INVENTORS
Hans Schurr
Hans Stahlecker
BY Ward Neal Haseltine
Osborne & Mallhammon
Attys INVENTORS
Hans Schurr
BY Hans Stahlecker
Wardwell Hamilton
Ames & McElhannon
Attys

SPINDLE DRIVING MECHANISM

Original Filed May 7, 1956 11 Sheets-Sheet 7

INVENTORS
Hans Schurr
Hans Stahlecker
BY
Howard Neal Hamilton
Orwin & Muellhaupt
Attys

SPINDLE DRIVING MECHANISM

Original Filed May 7, 1956 11 Sheets-Sheet 8

INVENTORS
Hans Schurr
BY Hans Stahlecker
Howard Neal Haselton
Ernest McElhannon
Attys INVENTORS
Hans Schurr
Hans Stahlecker
BY Ward Neal Haselton
Orne & McCllannon
Attys

SPINDLE DRIVING MECHANISM

Original Filed May 7, 1956 11 Sheets-Sheet 10

INVENTORS
Hans Schurr
Hans Stahlecker
BY
Wardwell Hamilton
Orme & McElhannon
Attys INVENTORS
Hans Schurr
Hans Stahlecker
BY
Wand Neal Haselton
Osmond & Ellmann
Attys United States Patent Office Re. 25,192
Reissued June 26, 1962

25,192

SPINDLE DRIVING MECHANISM

Hans Schurr and Hans Stahlecker, Sussen, Wurttemburg, Germany, assignors to Württembergische Spindelfabrik G.m.b.H., Sussen, Germany, a limited liability company of Germany Original No. 2,869,317, dated Jan. 20, 1959, Ser. No. 583,233, May 7, 1956. Application for reissue Jan. 6, 1961, Ser. No. 81,207
Claims priority, application Germany Aug. 9, 1955
19 Claims. (Cl. 57—105)

Matter enclosed in heavy brackets [ ] appears in the original patent but forms no part of this reissue specification; matter printed in italics indicates the additions made by reissue.

The present invention relates to drive mechanisms of the endless belt type, as applied to the spindles of spinning and twisting machines, which machines have long been constructed in the form of an elongated frame carrying two parallel rows of upstanding spindles. The number of spindles to be driven has usually run between two hundred and three hundred. Heretofore the spindles of such machines in some instances were individually driven by a cord which encircled a large pulley mounted on a drive shaft extending along the frame. The drive shaft and the pulleys carried thereby were mounted in the central space between the two rows of spindles and each cord ran from its drive pulley around the whirl of the spindle and then back to the drive pulley, fitting tightly in a groove provided between flanges on the whirl. The drive shaft and pulleys being located between the rows of spindles, access to the working parts of the drive was difficult, and the arrangement required that the ends of the cord be spliced together after encircling the drive shaft with an appropriate length of cord. The spliced joint in successively contacting the whirl, frequently subjected the spindle to repeated shocks which were objectionable. The cords had to be frequently replaced due to rapid wear, and the drive required in other respects a considerable amount of servicing attention.

Belt drives then came into vogue in which one belt served a group of spindles, usually four in number. However these belt drives were also driven by a drive shaft located between the rows of spindles where access to the working parts was difficult, and required large driving drums or pulleys, which were mounted on the drive shaft. In general these drums required an undesirably large amount of space. The draft created by the large rotating drums has aggravated the fouling of the machine. Also because of the large displacement required for belt drive mechanisms of the above type, which consumed much space between and underneath the rows of spindles, access to many of the parts was very difficult and they therefore have been hard to clean and maintain. Furthermore the large displacement of the drive mechanism left little room for other necessary elements of the machine, and made it difficult to cover the moving parts for safety purposes.

It is an object of the present invention to provide a new spindle drive mechanism of the endless belt type which will overcome the above mentioned shortcomings. Speaking generally, the endless belt drive mechanism of the present invention includes a drive shaft extending along the frame of the machine at the readily accessible side of the spindles to be served thereby i.e. the side at which the operator normally stands in tending the machine; drive pulleys carried by this shaft which are respectively positioned alongside the spindles to be respectively driven thereby; idler pulleys mounted respectively adjacent the drive pulleys; and guide pulleys offset with respect to their respective drive and idler pulleys—the drive and idler pulleys of each set of pulleys being interposed between the respective guide pulleys and the whirls of the spindles to be respectively served by the sets of pulleys. The drive shaft, drive pulleys and idler pulleys, and preferably the guide pulleys also, being all located at the readily accessible side of the spindles instead of between the rows of spindles or underneath the latter, all parts of the drive are readily accessible for inspection, cleaning or servicing, and a protective housing can readily be provided, and opened when access to the enclosed parts is desired.

The above mentioned coordinated relationship between the pulleys of each set, with the drive and idler pulleys positioned intermediately with respect to the whirls and guide pulleys as above mentioned, enables the driving belts which are associated with the respective sets of pulleys, to be looped at one extremity of the belts partially around the whirls of the spindles to be respectively served thereby, with intermediate portions of the belts respectively engaging and partially encircling their corresponding drive and idler pulleys, the guide pulleys being so mounted that their respective belts at the other extremities thereof, can be looped around the guide pulleys. The pulleys being coordinated as above set forth, the traverses of the belts, in passing to and from the whirls with their intermediate portions engaging respectively the drive and idler pulleys, follow paths which are located on the same side of the drive shaft. Accordingly the drive shaft is located exteriorly of the belts, thereby eliminating the drive shaft as an obstacle requiring the belts to be initially provided with open ends which would have to be spliced together after being placed in position encircling the drive shaft. The invention enables continuous, jointless driving belts to be used, which have important operational advantages and are simple and facile to install and remove.

In the preferred form of the invention, the sets of pulleys and driving belts as above referred to, are so coordinated with the whirls of the respective spindles to be served, that each driving belt serves one of the spindles individually, although in one of the broader aspects of the invention as hereinafter referred to in more detail, the belts and pulleys may be so coordinated with the whirls that more than one spindle is driven by the same belt.

From the above mentioned coordination of the pulleys with respect to each other and with respect to the whirls, it results that pulleys substantially smaller than heretofore can be satisfactorily used, the pulleys can be placed much more closely together, and short driving belts can be placed much more closely together, and short driving belts can be used which will still be long-lived due to the absence of undue strains or wear thereon. The driving mechanism requires but small space—no larger than required for the gear drives sometimes used for spindles, wherefore such a driving mechanism may be positioned at each of the readily accessible outer sides of the rows of spindles of the machine, without unduly encumbering said outer sides.

Particularly in installations where each belt serves a single spindle individually, as in the preferred form of the invention, the frictional forces required to be set up between the belt, the whirl and the drive pulley, may be substantially diminished, since whenever the spindle is braked to stop its rotation, the corresponding belt is not required to drive other spindles at full rotary speed while an individual spindle is stopped. In practicing the present invention in its preferred form, when an individual spindle is stopped, the moderate tension required for the corresponding individual belt will allow the latter to slip both with respect to its drive pulley and whirl, with the result that the whirl is only moderately strained and will not show wear even after a long running period. The :veral drive pulleys and spindle whirls being carefully nished to correspond in their respect diameters, exact eterminations by the stroboscope show no measurable ifferences between the speeds of the various spindles. he direction of rotation of the spindles may be readily :versed, and it is found that a normally slipless drive ›tating in either direction may be obtained with moder- e tension in the belts. Furthermore the power con- ımption will be as low or lower as compared to other indle driving mechanisms in current use, and likewise to the cost. Maintenance costs are relatively low, since e life of the endless, jointless belt is almost unlimited, ıd they run smoothly without undue strains or shocks, as to prolong the life of the spindles and bearings.

In one of its more specific aspects, the invention in- ıdes special features by way of bracket mountings for e idler and guide pulleys, the brackets being detachably nnected to the spindle or frame structure so that ma- ines equipped with other forms of spindle driving mech- ism, may be readily reconstructed to utilize driving echanism as herein contemplated, with a minimum of ernal alternations to the spindle and frame structure the machine.

Further objects and advantages of the invention will in part obvious and in part specifically referred to in description hereinafter contained which taken in con- ıction with the accompanying drawings, discloses vari- s forms of spindle driving mechanism which are con- ucted to function in accordance with the invention; the closure however should be considered as merely illus- tive of the invention in its broader aspects. In the ıwings FIGURE 1 is a transverse sectional view taken through spindle frame and housing, and showing a preferred m of spindle driving mechanism applied to the spindle ›wn.

Figure 1:
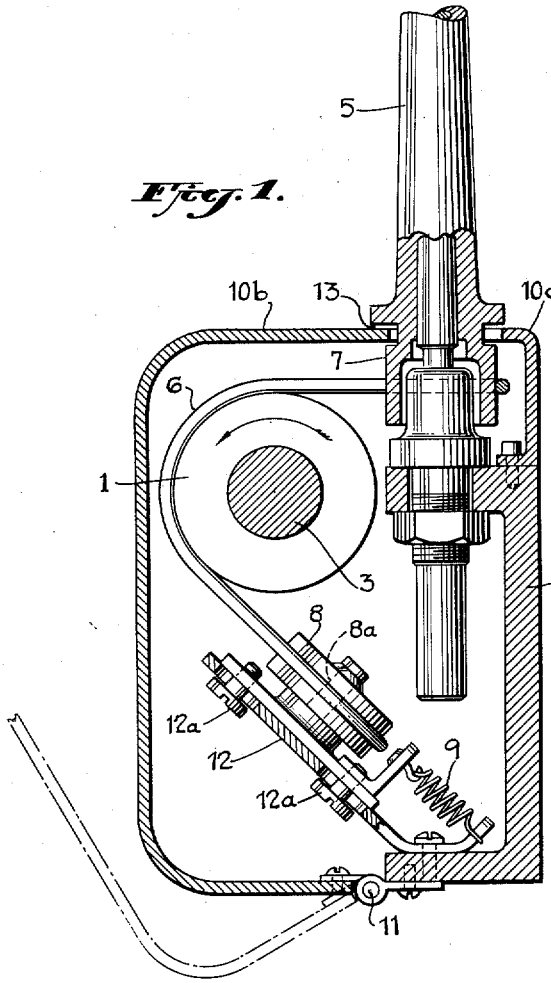
FIGURE 1a is a fragmentary view partly in section, ›wing in detail a form of joint which may be provided the spindle, between a movable cover and a stationary rt of the housing.

FIGURES 14–18 inclusive are views similar to FIGURE 1, but showing further modifications, more especially in regard to the mounting of the guide pulley and the idler pulley.

Figure 2:
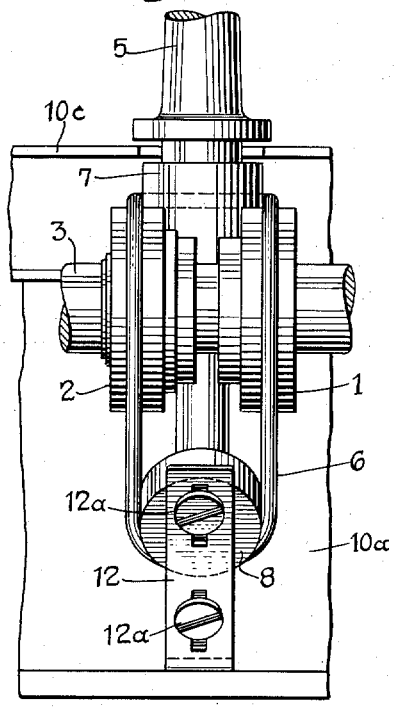
FIGURE 2 is a side view, looking from the left of GURE 1 toward the spindle driving mechanism shown FIGURE 1.
Figure 3:
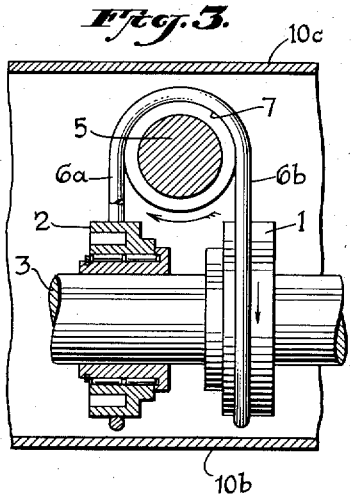
FIGURE 3 is a plan view of the spindle driving mecha- m shown in FIGURES 1 and 2, the idler pulley of h mechanism being shown in section.

Referring first to the preferred form of the invention illustrated in FIGURES 1–3, the machine may be understood as provided with a main frame 10a (FIGURE 1) extending longitudinally of the machine and on which a desired number of upstanding spindles 5 are appropriately mounted in a row, each spindle being provided with a whirl as indicated at 7. A drive shaft 3 extends along the frame at a readily accessible side of the spindle structure. Where the machine includes parallel rows of spindles, as is usual in the art, the drive shafts respectively serving the two rows of spindles, are preferably positioned respectively at the outer sides of the respective rows of spindles. The drive pulley 1 is preferably affixed to the shaft 3 in such position that its upper surface is approximately at the level of the whirl 7 to be served by the drive pulley 1. The idler pulley 2 is shown as rotatably mounted on the shaft 3 in spaced relation to the drive pulley 1, the idler pulley for example running on needle bearings as schematically indicated in FIGURE 3.

A bracket 12 is shown as extending up from the base of the frame 10a to mount the guide pulley 8 rotatably in position preferably underneath the previously mentioned pulleys, and preferably in the oblique position shown in FIGURES 1 and 2. The guide pulley 8 is appropriately journaled, for example about a stub shaft or axle 8a, so that a loop at one extremity of the endless belt 6 may be placed in the partially encircling position about the guide pulley 8, as shown in FIGURES 1 and 2. In other words the pulley 8 is open ended, so that a loop of the endless belt 6 may be thus placed in encircling position with respect to the pulley. The belt 6 which, in the embodiment of the invention under discussion takes the form of a cord, is preferably constructed of nylon or similar material formed into a continuous jointless band. As indicated by the adjustable bolts 12a shown in FIGURE 1, appropriate tension on the belt 6 may be imposed by adjusting the position, lengthwise of the bracket 12, in which the guide pulley 8 is clamped by the bolts 12a; or as indicated by the spring 9 in FIGURE 1, the bolts 12a may be left loose enough to permit the guide pulley 8 to slide longitudinally of bracket 12, appropriate tension being applied to the belt 6 by spring 9.

Assuming that the spindle 5 is to be turned in a clockwise direction as indicated in FIGURE 3, the intermediate portion 6b (FIGURE 3) of the belt 6 will pass from the whirl 7 and then partially around the drive pulley 1; then down and around the guide pulley 8; then up and partially around the idler pulley 2, from whence the return intermediate portion 6a (FIGURE 3) of the belt then passes to the whirl 7 as indicated in FIGURE 3. It will be noted that the path of travel of the belt 6 in respect both to its driving pass and its return pass, lies at one side of the driving shaft 3, wherefore the driving shaft does not interfere with the installation of an endless belt. Therefore a continuous, jointless belt may be used. In installing such a belt, the upper right hand extremity thereof (as the parts appear in FIGURE 1) may be first looped about whirl 7, which may be readily done with respect to spindles of known construction. Then the intermediate portions of the belt are respectively wrapped partially around and into engagement with the drive pulley 1, and the idler pulley 2. The bottom extremity of the belt (as the parts appear in FIGURE 1) may then be looped around the guide pulley 8 as previously described, appropriate tension then being applied to the belt as also already described. In removing the belt, the reverse procedure may be used.

It should be noted that the above described coordination of parts enables the driving mechanism for each individual spindle to be restricted to a small amount of space at one side of the frame. The driving pulley may be kept small in size since it has only to drive one spindle, and the requisite moderate tension may be readily applied by the guide pulley 8. The pulleys 2 and 8 may also be kept relatively small in size, and the course of travel of the belt is such that without imposing undue strains or wear, it will function smoothly and efficiently with the pulleys located close to each other and to the spindle. In other words, long belts such as have previously been generally used for such purposes, are not necessary. It will be noted that in the functional sense, the drive and idler pulleys are interposed between the whirl and the guide pulley, i.e., the drive and idler pulleys engage and control the movement of the intermediate portions of the belt which are passing in opposite directions with respect to each other, between the whirl and the guide pulley. As already stated, said intermediate portions pass only partially around the drive and idler pulleys at one side of the drive shaft, so that the drive shaft does not obstruct the installation of a continuous, jointless driving band.

Figure 1A:
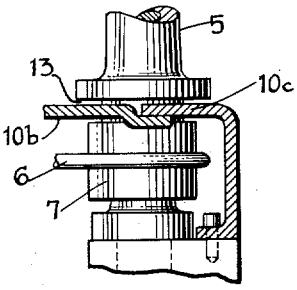

The resulting compact assembly enables a protective housing to be readily applied thereto. As shown in FIGURE 1, a movable cover 10b, for exampled hinged at 11, may be adjusted between the closed position shown, and a lower open position in which the enclosed parts of the drive are conveniently accessible for servicing. As shown in FIGURE 1a, the upper edge of the cover 10b when in closed position, may partially extend around the adjacent portion of the spindle 5, and engage with the upper wall of a fixed housing member 10c which is mounted on the frame 10a. As shown, the extension 10b engages in an annular groove 13 (FIGURE 1) in the spindle whirl, to prevent the spindle from being pulled out along with the bobbins when the latter are withdrawn therefrom.

With the pulleys coordinated with respect to each other and the whirl as above described, an endless belt of exceedingly short length may be satisfactorily employed, without subjecting the belt to undue strains or wear, shocks on the spindle are vertically eliminated, and no pronounced flanges such as would promote wear on the belt, are required on the whirl or on the pulleys, to keep the belt in its proper course of travel. It will be noted that during the travel of the belt, the drive and idler pulleys will rotate in opposite directions, being respectively in engagement with the driving and return passes of the belt.

Figure 4:
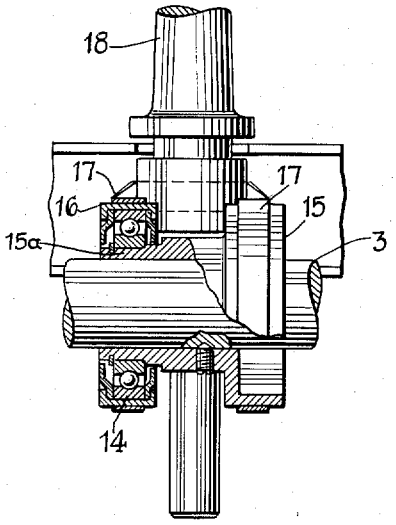
FIGURE 4 is a side view, with certain of the parts par- ly cut away, showing somewhat modified forms of drive ley and idler pulley.

FIGURE 4 shows a modified form of drive pulley and idler pulley construction, in which the endless driving belt 17 (comparable to the belt 6 previously described) takes the form of a thin jointless band preferably constructed of nylon or the like. In this form of invention the drive pulley 15 is provded with a hub 15a, upon which the idler pulley 16 is mounted by means of a ball bearing as indicated at 14. The trend surface of the idler pulley 16 is shown in the form of a ring mounted directly on the outer race of the bearing 14, while the inner race of the bearing is fixed to the hub 15a. Except as above specifically stated, the embodiment illustrated in FIGURE 4 may be regarded as similar to the one shown in FIGURES 1–3.

Figure 5:
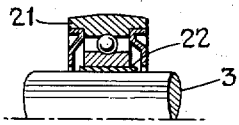
FIGURES 5 and 6 show further alternative modifica- ıs with respect to the construction of the idler pulley.
Figure 6:
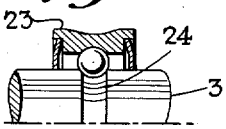

FIGURES 5 and 6 illustrate modifications in the construction of the idler pulley which may be used to make the idler pulley as small as possible. In FIGURE 5 the outer race 21 of the illustrated anti-friction bearing functions as the idler pulley, with the driving belt directly engaging the outer surface of this race, which acts as a tread surface. The inner race of the bearing is preferably secured to the drive shaft 3 by means of a ring 22 as shown in FIGURE 5.

As shown in FIGURE 6, the outer race 23 of a ball bearing again serves as the idler pulley, but the inner race of the bearing is constituted by an annular groove 24 formed directly in the outer surface of the drive shaft 3. As indicated respectively in FIGURES 5 and 6, the tread surface of the idler pulley may be either somewhat concave or convex, to assist in properly guiding the endless belt.

Figure 7:
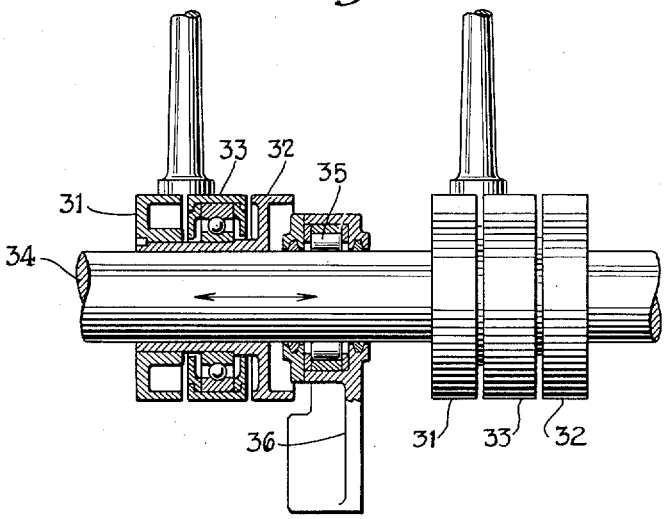
FIGURE 7 is a side view partly in section, showing two ıcent spindles equipped with modified forms of drive idler pulley, which may be used when the spindles to be selectively rotatable in reverse directions.

FIGURE 7 shows a form of the invention which may be utilized when it is desired that the mechanism is reversible in respect to the direction of rotation of the spindles. In this instance the mechanism is provided with two drive pulleys 31 and 32 respectively, both of which are fixed to the drive shaft 34, and the idler pulley 33 is rotatably mounted in position between these two drive pulleys. In the position shown at the left of FIGURE 7, the drive pulley 31 at the left is in operative position to receive the driving pass of the endless belt, while the idler pulley 33 is in operative position to receive the return pss of the driving belt. However if the drive shaft 34 be shifted to the left from the position shown at the left of FIGURE 7, while still maintaining the same direction of rotation of drive shaft 34, the pulley 31 will move out of engagement with the pass of the belt which is at the left of the spindle, and the idler pulley 33 will move into engagement with such pass. At the same time the drive pulley 32, which previously had been out of operating position, will move into engagement with the pass of the belt which is at the right of the spindle. So shifting the positions of pulleys 31—33 accordingly will reverse the direction of rotation of the spindle.

In FIGURE 7 there is shown a support 36 for the drive shaft 34 which encloses a roller bearing 35. Bearings of this type are preferred, to ease the endwise back and forth adjustment of the shaft 34 as above referred to. An appropriate number of such supports 36 and associated bearings may be understood as spaced along the shaft and appropriately secured to the frame. Such an arrangement is very suitable for use in connection with heavy duty spindles, where reversal of the direction of the spindles is desired. A similar reversal of rotation of the spindles may be obtained if the pulley 33 is secured to the shaft 34 to serve as a drive pulley, and the pulleys 31 and 32 are rotatably mounted on the shaft to secure selectively as idler pulleys when the shaft is shifted back and forth as above described.

Figure 8:
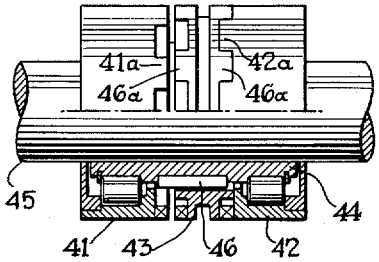
FIGURE 8 is a side view partially in section, which strates further modified forms of drive and idler pulleys pted for use where selective rotation in either direction esired.

FIGURE 8 illustrates an alternative drive pulley and idler pulley structure which may be used to secure reversal in the direction of rotation of the spindles, without requiring the drive shaft to be shifted longitudinally as above described in connection with FIGURE 7. Referring to FIGURE 8, the drive shaft 45 has rigidly secured thereto a collar 44 on which two pulleys 41 and 42 are rotatably mounted, these pulleys being provided with clutch teeth 41a and 42a respectively. A clutch member 43 is slidably mounted on collar 44 between the pulleys 41 and 42 by means of a spline 46, and is provided with clutch teeth 46a on its opposite sides. In the position shown in FIGURE 8, the clutch member 43 is engaged with pulley 42 so that the latter serves as the drive pulley, while the pulley 41 is disconnected from the clutch member so as to serve as the idler pulley. By shifting the clutch member 43 to the left from the position shown in FIGURE 8, this member 43 will engage with the pulley 41 so that the latter becomes the drive pulley, the pulley 42 then becoming disengaged from the clutch member to serve as the idler pulley. By thus shifting the clutch member 43, the direction of rotation of the spindle served by the pulleys 41 and 42 will be reversed, without requiring adjustment of the drive shaft. It will be understood that appropriate means (not shown) may be provided to shift the direcon of rotation of each spindle individually as last described, or alternatively to shift simultaneously the direction of rotation of all the spindles which are served by e shaft 45.

A drive shaft of relatively small diameter may be used, ice the individually driven spindles require only a very nall torque, and a single drive shaft may extend roughout the entire length of the frame, or a sectional aft may be used, with its adjacent sections appropriately nnected. Where a hardened shaft is to be used, for ample as preferred in connection with the embodiments own in FIGURES 6 and 7, a sectional shaft will ordinarily be more economical.

Figure 8A:
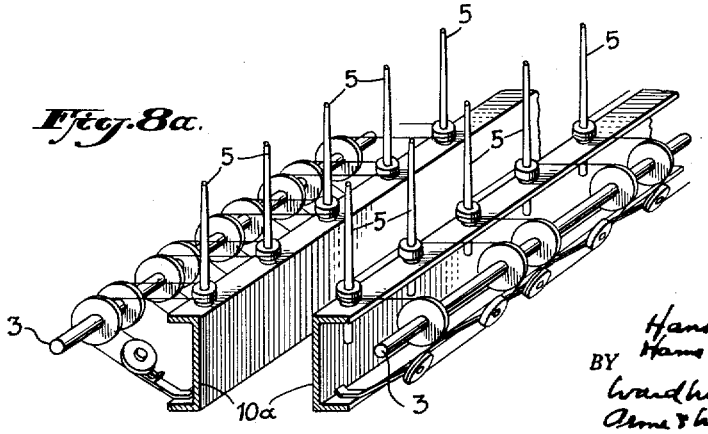
FIGURE 8a is a schematic perspective view of the con- tional machine equipped with spindle driving mecha- ns in accordance with the invention.

FIGURE 8a of the drawing shows schematically in erspective, the conventional spindle arrangement comising two spaced parallel rows of upstanding spindles The spindles at the left are carried by the frame 10a hich appears at the left of the figure, and are driven om the drive shaft 3 which is mounted on the outer, ore readily accessible side of the left hand row of indles. The pulleys provided for the row of spindles the left of FIGURE 8a may be as already described. he row of spindles at the right of FIGURE 8a is shown hematically as driven by means of a modified form of e invention, as hereinafter described more in detail in nnection with FIGURE 12. It will be noted that the rive shaft 3 for this last mentioned row of spindles is lso located on the outer and more accessible side of the indles.

The modifications of the invention as shown in FIGRES 9 to 13 illustrate means for facilitating the installation and improving the operating performances of the indle drives by extending the drive shaft through a ollow hub provided for the idler pulley, and supporting e idler independently of the drive shaft.

Figure 9:
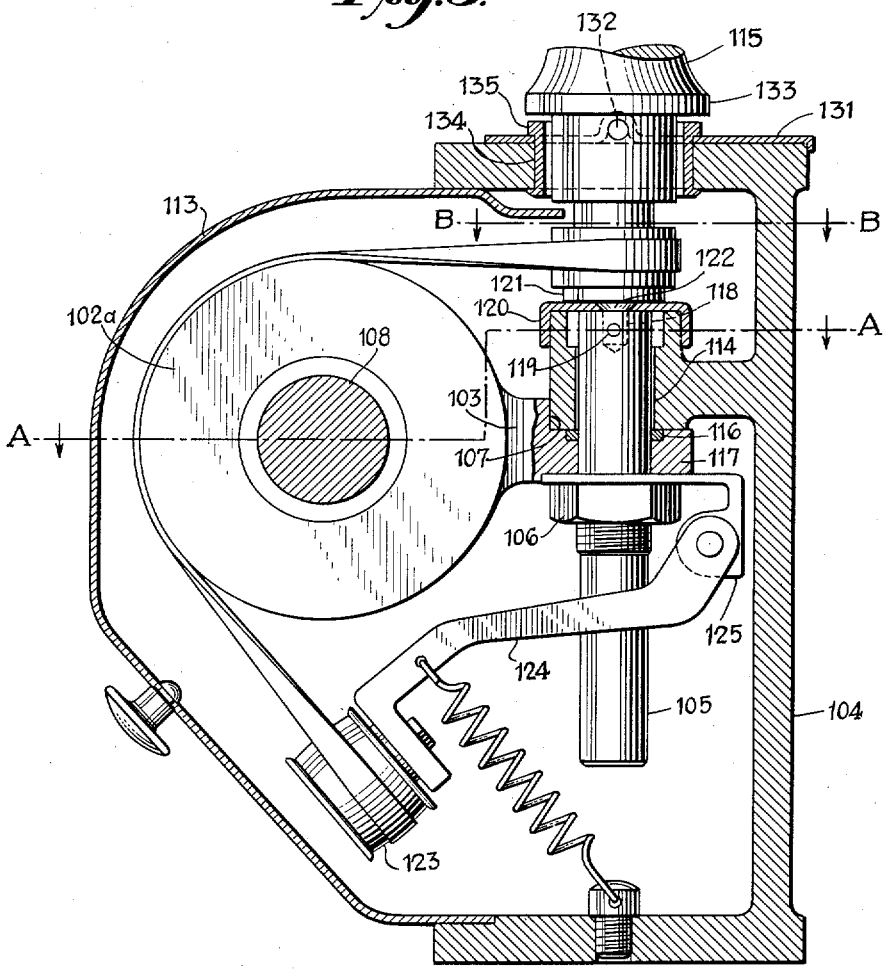
FIGURE 9 is a view similar to FIGURE 1, but show- a modified form of support for the guide pulley, and strating further specific features which may be used in nection with the assembly.
Figure 10:
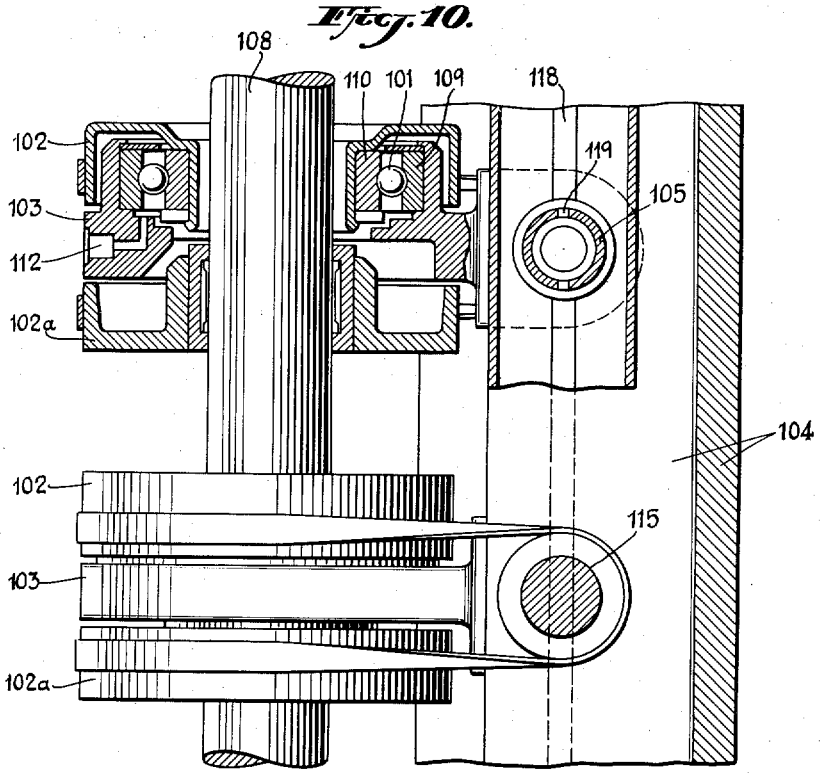
FIGURE 10 is a plan view showing two adjacent spin- equipped with a driving mechanism as shown in FIG- E 9, certain of the parts appearing in section, and the er part of FIGURE 10 being as viewed from the line -A of FIGURE 9, while the lower part of FIGURE 10 s viewed from the line B—B of FIGURE 9.

In the embodiment according to FIGURES 9 and 10, which the upper part of FIGURE 10 shows a section aken along line A—A and the lower part a section taken long line B—B of FIGURE 9, the ball bearing 101 of iler pulley 102 is mounted in a bracket 103 which is ecured to the spindle supporting frame 104, the spindle asing 105 and the spindle nut 106 (FIGURE 9) serving o secure bracket 103 to frame 104. A shoulder 107 n bracket 103 facilitates correct mounting, and so positions the housing that the axis of ball bearing 101 is oaxial with the drive shaft 108. The outer race 109 FIGURE 10) of ball bearing 101 is firmly secured in racket 103, while the rotatable inner race 110 is secured o and carries the hollow hub of idler pulley 102, which atter may be stamped out of sheet metal. Ball bearing 101 may be lubricated even during the operation of the nachine through a grease nipple 112 (FIGURE 10) in racket 103 which is easily accessible after the cover 113 FIGURE 9) has been opened or removed.

Bore 114 (FIGURE 9) in frame 104, in which spindle asing 105 of spindle 115 is mounted with only a small clearance, is sealed at its bottom by a gasket 116 which s fitted into the supporting extension 117 of bracket 103. Thus, oil which may be poured into the lubricating channel 118 provided in frame 104, cannot escape through bore 114 but must flow through the opening 119 of spindle casing 105 to the inside of the spindle. Lubricating channel 118 is closed by a cover 120 which, in turn, is held in place by a flange 121 of casing 105 resting thereon. Cover 120 is provided with openings 122 between adjacent spindles so that the oil which is poured into channel 118 may flow through openings 119 to the various spindles. For lubricating the spindles, it is therefore not necessary to remove them from their normal position or even to discontinue the operation of the machine.

The guide pulley 123 is shown in FIGURE 9 as rotatably mounted on a lever 124 pivotally mounted on a bracket 125. This bracket 125 may be made of sheet metal and together with bracket 103 and spindle casing 105, may be secured to the frame 104 by means of the nut 106. Such an arrangement facilitates the reconstruction of existing machines to include spindle driving mechanism in accordance with the invention, with a minimum of internal structural alterations.

Figure 11:
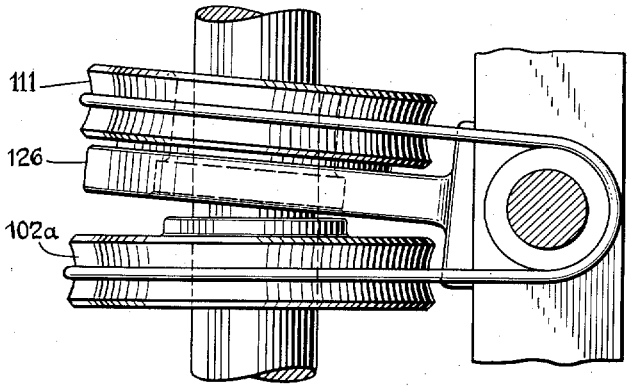
FIGURE 11 is a view similar to the lower part of FIG- E 10, but showing in particular a somewhat modified itioning of the idler pulley.

The idler pulley 102 as shown in FIGURES 9 and 10 is mounted coaxially with drive shaft 108. For this reason, the clearance between drive shaft 108 and the central bore of idler pulley 102 may be quite small. In certain cases it may be desirable to mount the idler pulley at an inclined position relative to the drive pulley so that the portion of the belt which passes from the spindle whirl to the idler pulley no longer extends parallel to that portion which runs from the drive pulley to the whirl. Such arrangement, as shown in FIGURE 11, may be of advantage, for example, in cases where the diameter of the guide pulley underneath the drive shaft differs considerably from the diameter of the spindle whirl. It will then be necessary to make the bore of the idler pulley 111 larger, and to position its supporting bracket 126 at a suitable angle, as indicated in FIGURE 11. In FIGURES 10 and 11, the drive pulley 102a may be assumed to be as described in connection with any of the previous figures.

In the embodiment shown in FIGURE 9, an upper plate 131 serves as a mounting element for the pivot pins 132 of a spindle brake (not shown) which may be of customary design and act, for example, upon a ring or flange 133 on the upper part of the spindle. Plate 131 may be secured to frame 104 by means of a hollow rivet 134 which has a slightly projecting head 135 to prevent dust or lint from entering into the drive housing.

Figure 12:
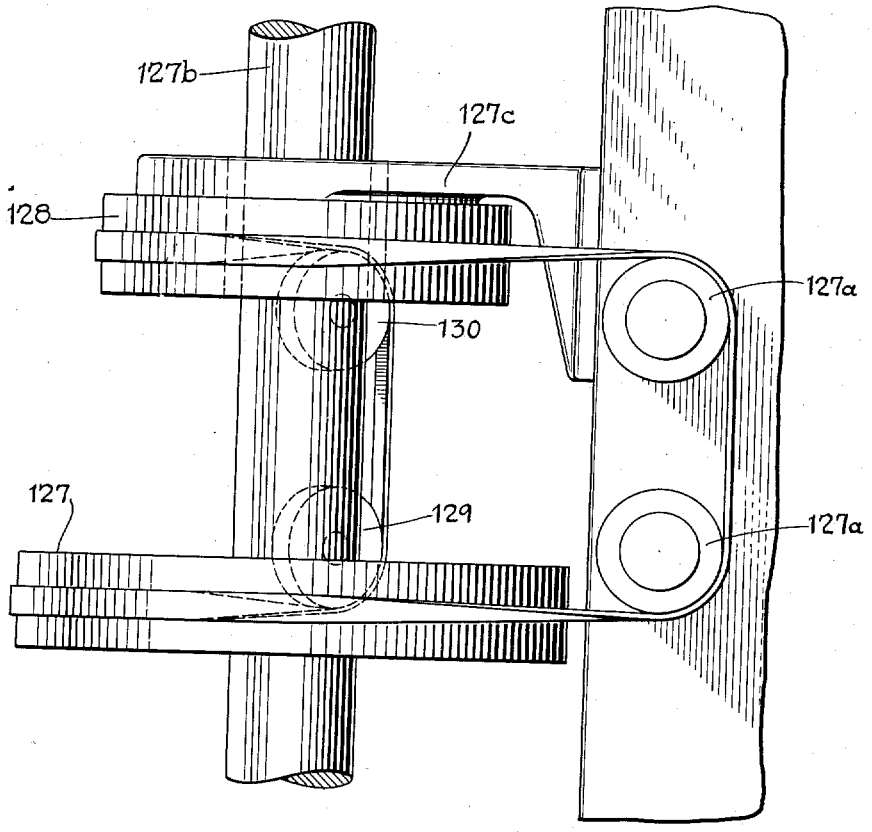
FIGURE 12 is a schematic plan view showing a form of the invention in which a single driving band serves two adjacent spindles.

FIGURE 12 illustrates diagrammatically a two-spindle drive for the spindles 127a, but otherwise similar to the one-spindle drive as shown in FIGURES 9 to 11, with a drive pulley 127 and an idler pulley 128 likewise disposed very close to their respective spindles. The drive shaft 127b also extends through the hollow hub of the idler pulley 128. The guide pulleys 129 and 130 underneath the drive shaft have a small diameter and may, if desired, be in the form of a single larger guide pulley. In the form of the invention shown in FIGURE 12, it will be noted that the loops at the opposite extremities of the belt are widened out, so to speak, to encircle both of the spindles 127a at one extremity of the belt, and the guide pulleys 129, 130 at the other extremities of the belt. Although as previously stated the invention in its preferred form contemplates endless belt drive mechanisms each of which serves its corresponding spindle individually, a drive mechanism of the character shown in FIGURE 12 will nevertheless partake to a substantial extent of the advantages above mentioned in connection with the already described forms of the invention.

Figure 13:
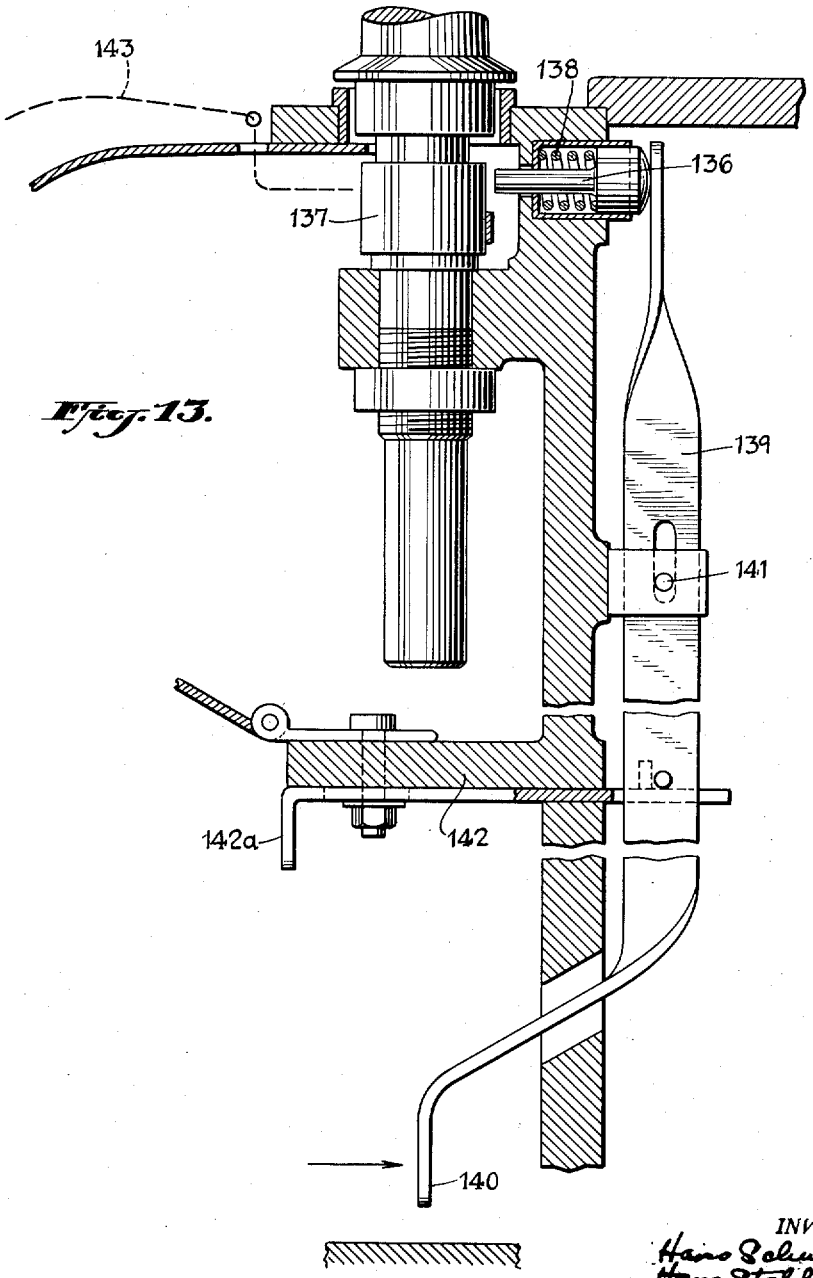
FIGURE 13 is a fragmentary vertical section illustrating a form of spindle brake which may be used in connection with the invention.

FIGURE 13 shows a spindle brake of special design which may act upon a disk mounted on the lower part of the spindle within the drive housing, or directly upon the spindle whirl. This brake may, for example, be designed as a foot brake, the connecting rod of which extends downwardly behind the drive mechanism. A brake pin 136 is shown as mounted in the frame to act either in a radial direction or eccentrically upon the upper portion of the whirl 137, while a spring 138 tends to maintain brake pin 136 and brake lever 139 in the inoperative position. For braking, the operator of the machine pushes with the tip of a toe against the lower end 140 of lever 139 and thereby turns the same about its pivot 141 in the direction of the arrow so that brake pin 136 will be forced into engagement with spindle whirl 137 or with any appropriate brake drum mounted on the spindle. Brake lever 139 may also be designed and mounted so that its lower end will be operated by a knee of the operator. The brake lever of such a knee brake then preferably extends forwardly underneath the drive housing 142.

The present invention also permits the application of brake levers or the like which may be mounted so as to be operated above or in front of the drive housing, and which may act upon brake drums or brake disks within the housing. A brake 143 of this type is shown diagrammatically in dotted lines in FIGURE 13.

Figure 14:
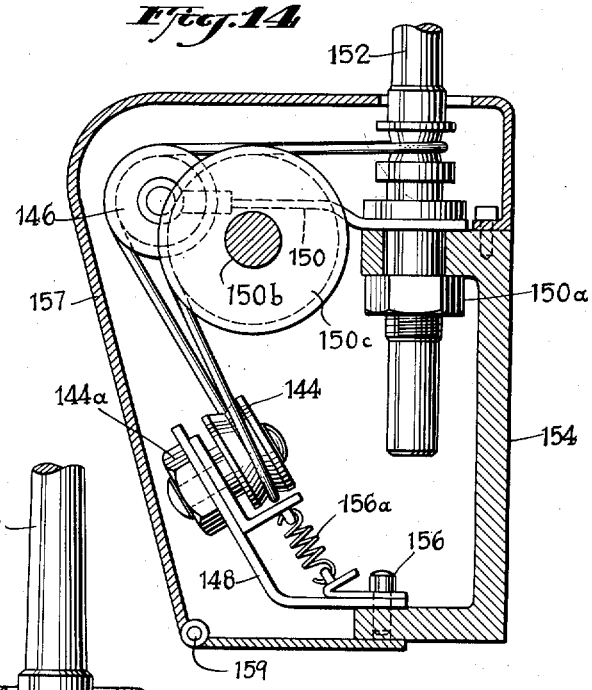

The spindle drive according to the present invention may be designed so that the idler pulleys and the guide pulleys have the same or at least similar shape and dimensions, and so that they may be mounted by means of suitable brackets directly on the frame which supports the spindles. In FIGURE 14 for example, the guide pulley 146 is shown as carried by a bracket 150 which surrounds the housing of the spindle 152, and is detachably clamped to the frame 154 by means of the usual spindle nut 150a. The guide pulley 144 of FIGURE 14 is mounted to be slidable along the bracket 148 by proper adjustment of the bolt 144a, the bracket being detachably mounted on the frame 154 by means of a bolt 156, and tension being applied to the belt by a spring 156a. The pulleys 144 and 146 of FIGURE 14 may readily be made identical in construction. The cover member 157 of FIGURE 14, shown as pivoted at 159, may be understood to be as already described in connection with FIGURES 1 and 1a, and likewise as to the drive shaft 150b and drive pulley 150c of FIGURE 14.

Figure 15:
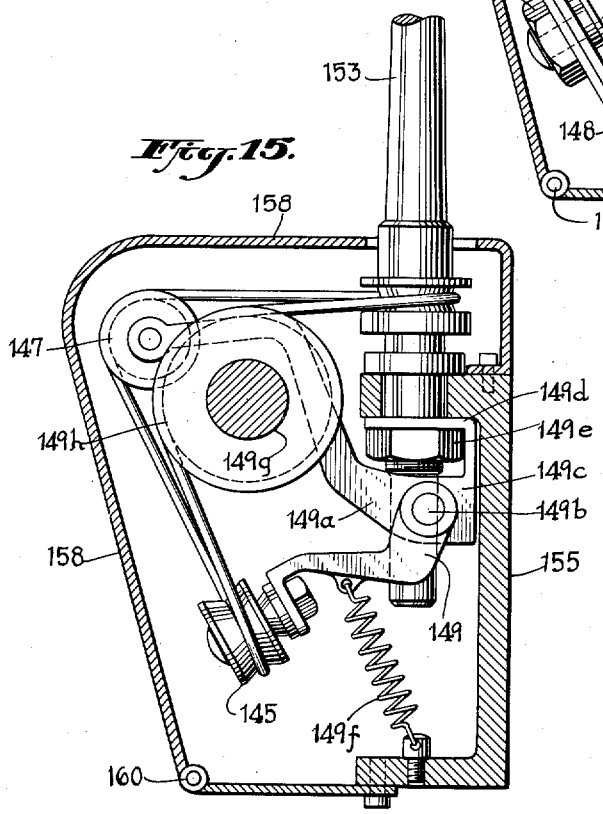

FIGURE 15 shows a form of the invention which is well adapted to situations where an existing machine having some other type of spindle drive is to be reconstructed to include a spindle drive mechanism constructed and operating in accordance with the present invention. In FIGURE 15, the idler pulley 147 is shown as carried by a bracket 149a which has fixed thereto at its inner end, a fitting 149c provided with a lip 149d which surrounds the lower portion of the spindle housing, and is detachably clamped in position by the usual spindle nut 149e. The guide pulley 145 of FIGURE 15 is pivotally mounted upon the bracket structure 149a—149d by means of a pin 149b which passes through the fitting 149c. An appropriate spring 149f is applied to the arm 149 to impose tension upon the belt through the medium of the guide pulley 145. The drive shaft 149g of FIGURE 15, and the drive pulley 149h may be understood to be similar to previously described corresponding parts.

A bracket structure of the type shown in FIGURE 15 lends itself very well to use in reconstructing machines equipped with other types of spindle drive, to utilize the present invention, the pulleys 145 and 147 being carried by a bracket structure which is readily inserted into and clamped in operating position by manipulation of the usual spindle nut 149e, and an appropriate spring 149f being provided. Particularly in view of the large number of spindles which are to be driven, such a bracket structure for accommodating the idler and guide pulleys serving a particular spindle, much simplifies the installation of the drive.

All of the driving elements of the spindle drives shown in FIGURE 15, including the lower parts of the spindles, may be fully enclosed in a housing which is formed by the frame 155 and a cover 158. The strong cast-iron frames are usually built in length sufficient for mounting twenty or even more spindles in a row therealong. Usually such a machine is equipped with 200–300 spindles mounted in parallel rows each of which will be served by a drive shaft and accompanying parts as above disclosed. In such instances the drive shafts will be mounted respectively at the outer exposed sides of the rows respectively served by them.

The cover 158, preferably made of thin sheet metal and therefore of light weight, may extend over several spindles. However, for convenience it is advisable to extend these covers, which may be opened by pivoting the same about the hinges 160, over no more than eight to twelve spindles, depending upon the distance between the individual spindles. Since cover 158 extends over the upper flange of the spindle whirl, they will, when in the closed position, prevent the spindles from being pulled upwardly when the bobbins are being withdrawn therefrom.

Figure 16:
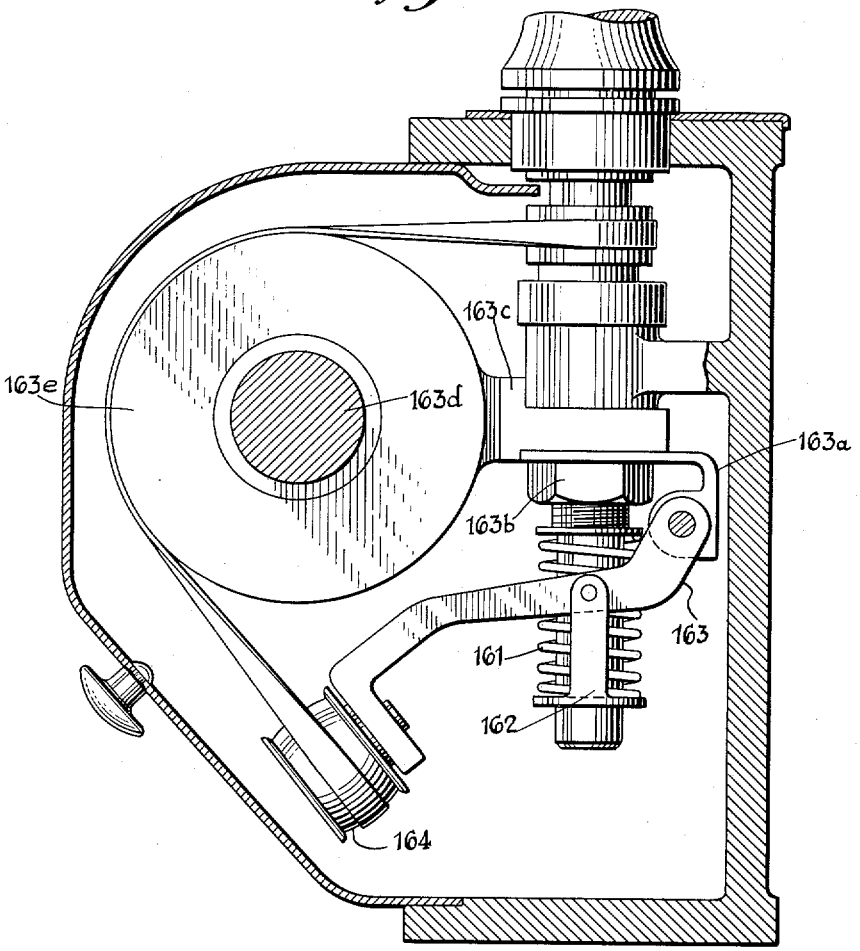

FIGURE 16 illustrates a modification of the invention in which a compressed spring 161 is mounted on the lower part of the spindle housing. This compression spring takes the place of the draw spring and acts upon the fitting 162 which is slidable along the spindle housing, and which is secured to the pivoted lever 163 upon which the guide pulley 164 is rotatably supported. The lever 163 is shown as pivotally carried by an angle plate 163a which surrounds the adjacent part of the spindle housing, and is detachably clamped in position by the spindle nut 163b. A bracket 163c is also shown in FIGURE 16 as clamped in position by the nut 163b. This bracket may be understood as similar to the bracket 103 previously described in connection with FIGURES 9 and 10. In FIGURE 16 the drive shaft 163d is shown as carrying the drive pulley 163e.

Figure 17:
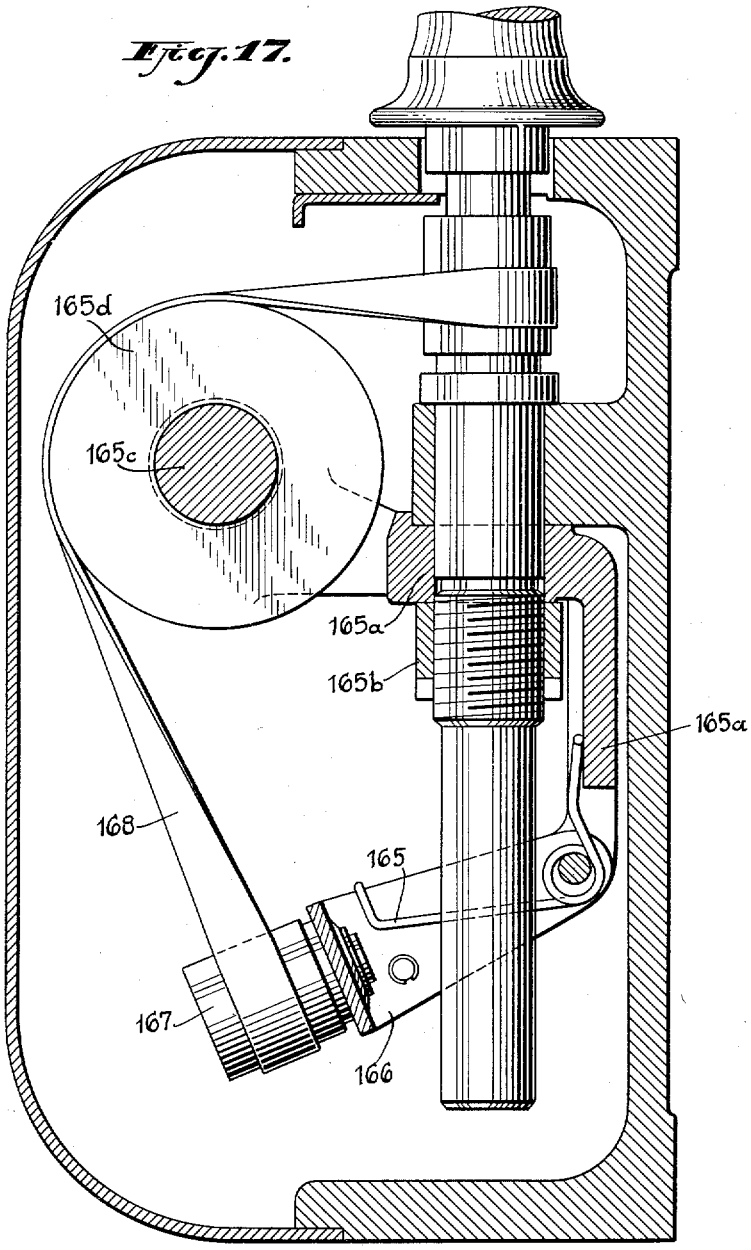

For tensioning the guide pulley, it is also possible to apply a torsional spring 165 as shown in FIGURE 17, which may be secured directly on the bracket 165a which supports an idler pulley (not shown) as previously described. Torsion spring 165 tends to force lever 166 and guide pulley 167 downwardly, thereby tensioning the belt 168. In FIGURE 17 the spindle nut 165b detachably clamps the bracket 165a in position, and the drive shaft 165c is shown as supporting the drive pulley 165d.

Figure 18:
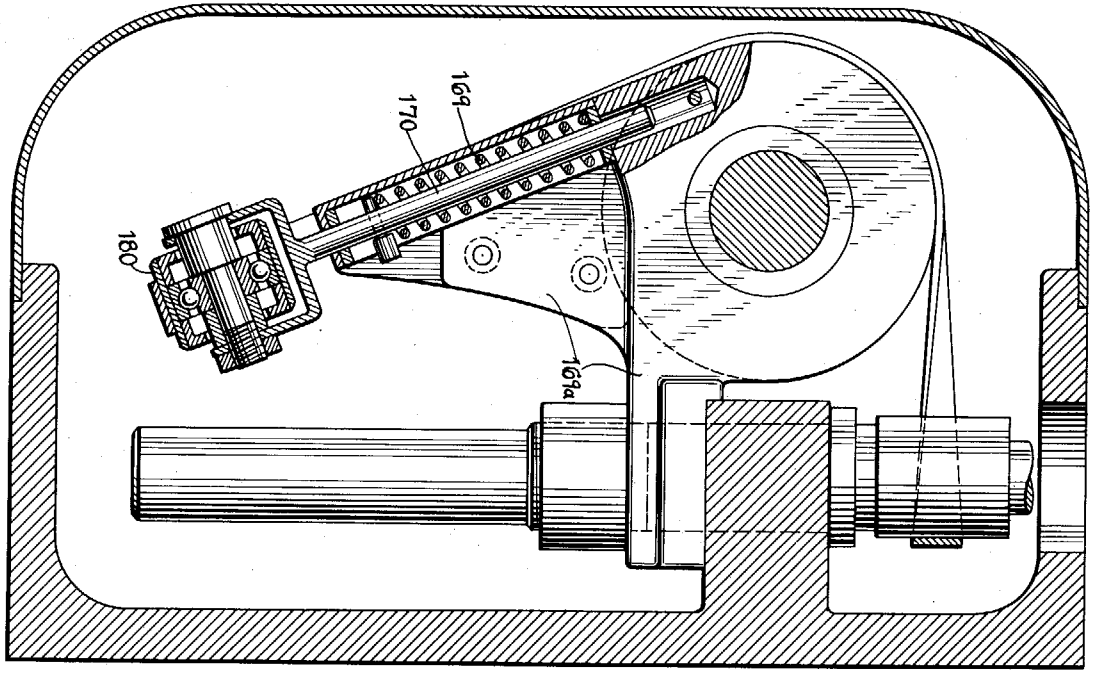

FIGURE 18 illustrates still another embodiment of the invention in which a compressed spring 169 is mounted within and slidably carried by the bracket 169a which supports an idler pulley as previously described in connection with FIGURE 10. Spring 169 acts upon a plunger 170 which rotatably supports the guide pulley 180, to impose tension on the belt. This embodiment has the advantage that it permits the guide pulley to be made quite narrow, since the direction in which tension is applied to the belt always remains the same.

Although the invention has been illustrated and described with reference to the above described embodiments thereof, it should be understood that in its broader aspects the invention is not limited to the details of such embodiments, but is capable of numerous modifications, within the scope of the appended claims.

We claim:

1. A driving mechanism for the spindles of spinning, twisting and like machines, which machines include a framework *having rail-like frame members* carrying spaced rows of upstanding spindles, said driving mechanism including a drive shaft extending along the framework [and disposed at the outer, readily accessible side of one of the rows of spindles], a drive pulley driven by said drive shaft and positioned alongside one of said spindles [at said outer readily accessible side thereof], an idler pulley disposed adjacent said drive pulley [at said outer side of the last mentioned spindle], a guide pulley disposed in offset position with respect to said first mentioned pulleys, and an endless belt having looped portions adjacent its opposite extremities, one of which looped portions engages and partially encircles said spindle, the other of said looped portions engaging and partially encircling said guide pulley, said belt having oppositely traveling portions intermediate said looped portions, one of which oppositely traveling portions engages and partially encircles said drive pulley, and the other of which intermediate oppositely traveling portions engages and partially encircles [said idler pulley.] *said idler pulley, the parts consisting of said drive shaft and of said drive pulley as well as of said idler pulley and of said guide pulley being disposed in close proximity to the corresponding spindle to enable the support and bearing means thereof to be supported on said rail-like frame members.*

2. A driving mechanism for the spindles of spinning, twisting and like machines, which machines include a framework carrying spaced rows of upstanding spindles, said driving mechanism including a drive shaft extending along the framework and disposed at the outer, readily accessible side of one of the rows of spindles, a series of drive pulleys driven by and spaced along said drive shaft in positions respectively alongside successive spindles of said last mentioned row of spindles, idler pulleys disposed respectively adjacent the aforesaid drive pulleys at said outer side of said last mentioned spindles, guide pulleys disposed respectively in offset positions with respect to each set of adjacent drive an idler pulleys, and endless belts each serving one of said last mentioned spindles individually, said belts having looped portions adjacent their opposite extremities, one of which looped portions engages and partially encircles the spindle served thereby, the other of said looped portions engaging and partially encircling the guide pulley serving the corresponding spindle, said belts having oppositely traveling portions intermediate said looped portions, one of which oppositely traveling portions engages and partially encircles the drive pulley serving the corresponding spindle, and the other of which intermediate oppositely traveling portions engages and partially encircles the idler pulley serving the corresponding spindle.

3. In combination, two adjacent parallel rows of vertically disposed spindles each provided with a whirl, *essentially* horizontal drive shafts *one each* mounted *on one respective side* [one on each of the outer readily accessible sides] of said rows alongside the spindles *and in close proximity thereto so as to be readily accessible from the outer side of said spindle rows,* drive pulleys mounted on said shafts [and disposed respectively on said outer sides], idler pulleys mounted alongside at least certain of said drive pulleys [and disposed respectively on said outer sides], the upper surfaces of the drive and idler pulleys lying substantially in the plane of the spindle whirls, guide pulleys mounted below the drive and idler pulleys [and] *so as to be readily* accessible respectively from the [aforesaid] outer sides of the spindle rows, and belts for driving the whirls of each row of spindles from the drive pulleys of the adjacent shaft, each belt having an upper end loop portion partially encircling a whirl, oppositely moving intermediate portions passing to and from a whirl above the shafts and respectively around the upper an outer surfaces of a drive and an idler pulley, and a lower end loop portion partially encircling a guide pulley.

4. A driving mechanism for the spindles of spinning, twisting and like machines, which machines include a framework carrying spaced rows of upstanding spindles, said driving mechanism including a drive shaft extending along the framework and disposed at the outer, readily accessible side of one of the rows of spindles, a drive pulley driven by said spindles at said outer readily accessible side thereof, an idler pulley disposed adjacent said drive pulley at said outer side of the last mentioned spindle, a guide pulley disposed in offset position with respect to said first mentioned pulleys, and an endless belt having looped portions adjacent its opposite extremities, one of which looped portions engages[,] and partially encircles said spindle, the other of said looped portions engaging and partially encircling said guide pulley, said belt having oppositely traveling portions intermediate said looped portions, one of which oppositely traveling portions engages and partially encircles said drive pulley, and the other of which intermediate oppositely traveling portions engages and partially encircles said idler pulley, said spindle and guide pulley both affording engagement of said looped portions respectively therewith when said belt is in endless form, and said drive shaft being located exteriorly with respect to said endless belt, whereby the belt may be installed in its endless form.

5. A driving mechanism for the spindles of spinning, twisting and like machines, which machines include a framework carrying spaced rows of upstanding spindles, said driving mechanism including a drive shaft extending along the framework and disposed at the outer, readily accessible side of one of the rows of spindles, a drive pulley driven by said drive shaft and positioned alongside one of said spindles at said outer readily accessible side thereof, an idler pulley disposed adjacent said drive pulley at said outer side of the last mentioned spindle, a guide pulley disposed in offset position with respect to said first mentioned pulleys, and an endless belt having looped portions adjacent its opposite extremities, one of which looped portions engages and partially encircles said spindle, the other of said looped portions engaging and partially encircling said guide pulley, said belt having oppositely traveling portions intermediate said looped portions, one of which oppositely traveling portions engages and partially encircles said drive pulley, and the other of which intermediate oppositely traveling portions engages and partially encircles said idler pulley, and means affording adjustment of the position of said guide pulley to control the tension imposed on the belt.

6. A driving mechanism for the spindles of spinning, twisting and like machines, which machines include a framework carrying spaced rows of upstanding spindles provided with whirls, a drive shaft extending horizontally along the framework and disposed at the outer readily accessible side of one of said rows of spindles, and an endless belt drive mechanism serving one of said last mentioned spindles individually, said drive mechanism including a first pulley and a second pulley, both of which pulleys are located at said outer side of said last mentioned spindle and have tread portions which are positioned approximately at the level of the whirl of said last mentioned spindle, said pulleys being mounted to afford rotation in reverse directions, a third pulley mounted in offset position with respect to said first mentioned pulleys, and an endless belt having looped portions at its opposite extremities respectively engaging the whirl of said last mentioned spindle and third pulley, said belt having a portion intermediate said whirl and third pulley which engages and partially encircles one of said first mentioned pulleys, said drive shaft being located exteriorly with respect to said endless belt, said belt also having a second portion intermediate said whirl and the third pulley, which second intermediate portion engages and passes partially around the other of said first mentioned pulleys to cause said first and second mentioned pulleys to rotate in reverse directions, one of the aforesaid pulleys being driven by said drive shaft.

7. A driving mechanism for the spindles of spinning, twisting and like machines which include a frame, spaced rows of spindles carried thereby, a drive shaft extending along the frame and disposed at the outer readily accessible side of one of said rows of spindles, a drive pulley disposed at said outer side driven by said drive shaft and positioned alongside one of said spindles of the corresponding row of spindles, an idler pulley disposed adjacent said drive pulley at the aforesaid side of said spindle, a guide pulley disposed in offset position with respect to said first mentioned pulleys, and an endless belt having looped portions adjacent its opposite extremities, one of which looped portions engages and partially encircles said spindle, the other of said looped portions engaging and partially encircling said guide pulley, said belt having oppositely traveling portions intermediate said looped portions, one of which oppositely traveling portions engages and partially encircles said drive pulley, and the other of which intermediate oppositely traveling portions engages and partially encircles said idler pulley, a bracket extending from said frame into the space at the aforesaid outer side, said bracket carrying said idler and guide pulleys, and means detachably securing said bracket in position with respect to said frame[work] and spindle.

8. A driving mechanism for the spindles of spinning, twisting and like machines which include a frame, spaced rows of spindles carried thereby, a drive shaft extending along the frame and disposed at the outer readily accessible side of one of said rows of spindles, a drive pulley disposed at said outer side driven by said drive shaft and positioned alongside one of said spindles of the corresponding row of spindles, an idler pulley disposed adjacent said drive pulley at the aforesaid side of said spindle, a guide pulley disposed in offset position with respect to said first mentioned pulleys, and an endless belt having looped portions adjacent its opposite extremities, one of which looped portions engages and partially encircles said spindle, the other of said looped portions engaging and partially encircling said guide pulley, said belt having oppositely traveling portions intermediate said looped portions, one of which oppositely traveling portions engages and partially encircles said drive pulley, and the other of which intermediate oppositely traveling portions engages and partially encircles said idler pulley, a bracket extending from said frame into the space at the aforesaid outer side, said bracket carrying said idler and guide pulleys, and means detachably securing said bracket in position with respect to said frame[work] and spindle, said bracket including a movably mounted arm carrying said guide pulley, and means urging said arm to impose tension on the belt.

9. A driving mechanism for the spindles of spinning, twisting and like machines which include a frame, a spindle carried thereby, a drive shaft extending along the frame and disposed at one side of said spindle, a drive pulley driven by said drive shaft and positioned alongside said spindle, spaced drive pulleys carried by said shaft adjacent one of said spindles, an idler pulley interposed between said drive pulleys, a guide pulley disposed in offset position with respect to the above mentioned pulleys, and an endless belt having looped portions adjacent its opposite extremities, one of which looped portions engages and partially encircles said spindle, the other of said looped portions engaging and partially encircling said guide pulley, said belt having oppositely traveling portions intermediate said looped portions, one of which oppositely traveling intermediate portions engages and partially encircles one of said drive pulleys and the other of which intermediate oppositely traveling portions engages and partially encircles said idler pulley, and means mounting said drive shaft to afford axial movement thereof and thereby to engage said belt selectively with said drive pulleys and reverse the direction of rotation of said spindle.

10. A driving mechanism for the spindles of spinning, twisting and like machines, which machines include a framework carrying spaced rows of upstanding spindles, said driving mechanism including a drive shaft extending horizontally along the framework and disposed at the outer, readily accessible side of one of the rows of spindles, a drive pulley carried by said shaft at said outer side and alongside one of said spindles, an idler pulley disposed at said side adjacent said drive pulley, at least one guide pulley disposed in offset position with respect to said first mentioned pulleys, and an endless belt drive mechanism serving a plurality of said spindles, said drive mechanism including an endless belt having looped portions adjacent its opposite extremities, one of which looped portions engages and partially encircles adjacent spindles of said last mentioned row of spindles, the other of which looped portions engages and partially encircles said guide pulley, said belt having oppositely traveling portions intermediate said looped portions, one of which oppositely traveling intermediate portions engages and partially encircles said drive pulley, and the other of which oppositely traveling intermediate portions engages and partially encircles said idler pulley.

11. In a structure as claimed in claim 3 and including frame members supporting the spindles, the improvement which comprises individual bracket units each incorporating and providing journal support for one of the idler pulleys and at least one of the guide pulleys, and means for removably securing each of the individual bracket units to the said frame members.

12. In a structure as claimed in claim 3 and including frame members supporting the spindles, the improvement which comprises individual bracket units each incorporating and providing journal support for one of the idler pulleys and at least one of the guide pulleys, and means for removably securing each of the individual bracket units to the said frame members, said bracket *units* carrying means affording adjustment of the position of said last mentioned guide pulley relative to said idler pulley.

13. A driving mechanism for the spindles of spinning, twisting and like machines, which machines include a framework carrying a row of upstanding spindles, said driving mechanism including a drive shaft extending along the framework and disposed at the outer, readily accessible side of said row of spindles, drive pulleys mounted in spaced relation along said drive shaft and driven thereby, said drive pulleys being positioned respectively alongside successive spindles of said row, idler pulleys also disposed at said readily accessible side of said row of spindles and positioned respectively between adjacent drive pulleys, said idler pulleys being also positioned respectively alongside successive spindles of said row, guide pulleys also disposed on said readily accessible side of said row of spindles, said guide pulleys being disposed in offset positions with respect to said drive and idler pulleys, such a guide pulley being provided to serve each successive adjacent pair of said drive and idler pulleys, endless belts being provided to serve respectively successive spindles of said row, each of such endless belts having looped portions adjacent its opposite extremities, one of such looped portions engaging and partially encircling the corresponding spindle, the other of said looped portions engaging and partially encircling the corresponding guide pulley, each of said belts having oppositely traveling portions intermediate said looped portions, one of such oppositely traveling portions engaging and partially encircling the corresponding drive pulley, the other of such intermediate oppositely traveling portions engaging and partially encircling the corresponding idler pulley.

14. A driving mechanism for the spindles of spinning, twisting and like machines, which machines include a framework carrying a row of upstanding spindles, said driving mechanism including a drive shaft extending along the framework and disposed at [the outer, readily accessible] *one* side of said row *in close proximity to the spindles thereof,* a drive pulley driven by said drive shaft and positioned alongside one of said spindles at said [outer readily accessible] side thereof, an idler pulley disposed adjacent said drive pulley at said [outer] side of the last mentioned spindle, a guide pulley disposed in offset position with respect to said first mentioned pulleys, and an endless belt having looped portions adjacent its opposite extremities, one of which looped portions engages and partially encircles said spindle, the other of said looped portions engaging and partially encircling said guide pulley, said belt having oppositely traveling portions intermediate said looped portions, one of which oppositely traveling portions engages and partially encircles said drive pulley, and the other of which intermediate oppositely traveling portions engages and partially encircles said idler pulley, a housing being provided to enclose said drive shaft, pulleys and belt, said housing including means adjustable to expose said mechanism for *ready* access thereto [at said outer side] *from the outside.*

15. A driving mechanism for the spindles of spinning, twisting and like machines, which machines include a framework carrying a row of upstanding spindles, said driving mechanism including a drive shaft extending along the framework and disposed at the outer, readily accessible side of said row, a drive pulley driven by said drive shaft and positioned alongside one of said spindles at said outer readily accessible side thereof, an idler pulley disposed adjacent said drive pulley at said uter side of the last mentioned spindle, a guide pulley isposed in offset position with respect to said first menioned pulleys, and an endless belt having looped portions djacent its opposite extremities, one of which looped ortions engages and partially encircles said spindle, the ther of said looped portions engaging and partially encircling said guide pulley, said belt having oppositely raveling portions intermediate said looped portions, one f which oppositely traveling portions engages and artially encircles said drive pulley, and the other of which ntermediate oppositely traveling portions engages and artially encircles said idler pulley, said spindle having a asing clamped in position on said frame by a nut memer, and a bracket structure also clamped in position with espect to said frame by said nut member, said bracket tructure having arms extending into the space at said uter readily accessible side, which arms respectively arry said idler pulley and guide pulley.

*16. A driving mechanism for the spindles of spinning, wisting and like machines, which machines include a rame having a rail carrying a spindle, a drive shaft exending along the frame and disposed at one side of said pindle, a drive pulley driven by said drive shaft and ositioned alongside said spindle, an idler pulley disposed adjacent said drive pulley at the aforesaid side of the spindle, a guide pulley disposed in offset position with respect to said first mentioned pulleys, and an enless belt having looped portions adjacent its opposite extremities, one of which looped portions engages and partially encircles said spindle, the other of said looped portions engaging and partially encircling said guide pulley, said belt having oppositely traveling portions intermediate said looped portions, one of which oppositely traveling portions engages and partially encircles said drive pulley, and the other of which intermediate oppositely traveling portions engages and partially encircles said idler pulley, the parts consisting of said drive shaft, said drive pulley, said idler pulley and said guide pulley being disposed in close proximity to the corresponding spindle to enable the support and bearing means thereof to be supported on said spindle rail.*

*17. A driving mechanism for the spindles of spinning, twisting and like machines, which includes a frame having a rail-like frame member carrying an upstanding spindle provided with a whirl, a drive shaft extending essentially horizontally along the frame and disposed at one side of said spindle, a drive pulley carried by said drive shaft and positioned at the aforesaid side of said spindle, an idler pulley disposed adjacent said drive pulley at the aforesaid side of the spindle, said drive pulley and said idler pulley having upper tread portions and the upper tread portions of said pulleys being disposed approximately at the level of the whirl, a guide pulley disposed in offset position with respect to said first mentioned pulleys, and an endless belt having looped portions adjacent its opposite extremities, one of which looped portions engages and partially encircles said spindle, the other of said looped portions engaging and partially encircling said guide pulley, said belt having oppositely traveling portions intermediate said looped portions, one of which oppositely traveling portions extends from said whirl over the upper tread portion of said drive pulley and thence downwardly and partially around the drive pulley to said guide pulley, the other of said intermediate oppositely traveling portions of the belt extending from said whirl to the upper tread portion of said idler pulley and thence downwardly and partially around said idler pulley to guide said pulley, the parts consisting of said drive shaft, said drive pulley, said idler pulley and said guide pulley being disposed in close proximity to the corresponding spindle to enable the support and bearing means thereof to be supported on said rail-like frame member.*

*18. A driving mechanism for the spindles of spinning, twisting and like machines, which includes a frame having a rail-like frame member, an upstanding spindle carried by said rail-like frame member and provided with a whirl, a drive shaft extending horizontally along the frame and disposed at one side of said spindle, a drive pulley carried by said drive shaft and positioned at the aforesaid side of said spindle, an idler pulley disposed adjacent said drive pulley at the aforesaid side of the spindle, said drive pulley and said idler pulley having upper tread portions and the upper tread portions of said pulleys being disposed approximately at the level of the whirl, a guide pulley also positioned at the aforesaid side of the spindle and disposed at a lower level with respect to said first mentioned pulleys, and an endless belt having looped portions adjacent its opposite extremities, one of which looped portions engages and partially encircles said spindle, the other of said looped portions engaging and partially encircling said guide pulley, said belt having oppositely traveling portions intermediate said looped portions, one of which oppositely traveling portions extends from said whirl over the upper tread portion of said drive pulley and thence downwardly and partially around the drive pulley to said guide pulley, the other of said intermediate oppositely traveling portions of the belt extending from said whirl to the upper tread portion of said idler pulley and thence downwardly and partially around said idler pulley to guide said pulley, the parts consisting of said drive shaft, said drive pulley, said idler pulley and said guide pulley being disposed in close proximity to the corresponding spindle to enable the support and bearing means thereof to be supported on said rail-like frame member.*

*19. A driving mechanism for the spindles of spinning, twisting and like machines, which machines include a framework, at least one spindle carried by said frame, a drive shaft extending along the framework and disposed at one side of said spindle, a drive pulley mounted on said drive shaft and positioned alongside said spindle, a readily accessible idler pulley disposed adjacent said drive pulley, a readily accessible guide pulley disposed in offset position with respect to said first mentioned pulley, and an endless belt having looped portions adjacent its opposite extremities, one of which looped portions engages and partially encircles said spindle, the other of said looped portions engaging and partially encircling said guide pulley, said belt having oppositely traveling portions intermediate said looped portions, one of which oppositiely traveling portions engages and partially encircles said drive pulley, and the other of which intermediate oppositely traveling portions engages and partially encircles said idler pulley, said drive shaft being located in close proximity to said spindle so that all of said pulleys as well as said belt are readily accessible from without said framework.*

References Cited in the file of this patent or the original patent

UNITED STATES PATENTS

| | | |
|---|---|---|
| 989,050 | Rhoades | Apr. 11, 1911 |
| 2,519,769 | Kooistra | Aug. 22, 1950 |

FOREIGN PATENTS

| | | |
|---|---|---|
| 745,897 | France | Feb. 27, 1933 |
| 766,044 | France | Apr. 9, 1934 |
| 675,928 | Germany | May 21, 1939 |
| 701,492 | Germany | Jan. 17, 1941 |
| 11,378 | Great Britain | of 1888 |
| 405,100 | Great Britain | Feb. 1, 1934 |
| 328,448 | Italy | Aug. 9, 1935 |
| 279,591 | Switzerland | Mar. 17, 1952 |